(12) United States Patent
Schnieders

(10) Patent No.: US 12,057,930 B2
(45) Date of Patent: Aug. 6, 2024

(54) SYNCHRONIZING A DISTRIBUTED APPLICATION VIA A COMMUNICATION NETWORK

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

(*) Notice: Subject to any disclaimer, the term of this patent is extended or adjusted under 35 U.S.C. 154(b) by 128 days.

(21) Appl. No.: 17/712,200

(22) Filed: Apr. 4, 2022

(65) Prior Publication Data
US 2022/0329338 A1    Oct. 13, 2022

(30) Foreign Application Priority Data
Apr. 8, 2021   (EP) ..................................... 21167343

(51) Int. Cl.
*H04J 3/06*     (2006.01)
*H04L 1/20*     (2006.01)

(52) U.S. Cl.
CPC .......... *H04J 3/0667* (2013.01); *H04J 3/0644* (2013.01); *H04L 1/205* (2013.01)

(58) Field of Classification Search
CPC .......... H04J 3/0667; H04J 3/0644; H04J 3/14; H04L 1/205; H04L 43/16; H04L 43/0852; H04L 43/0888
See application file for complete search history.

(56) References Cited

U.S. PATENT DOCUMENTS

| | | | | |
|---|---|---|---|---|
| 6,014,694 A | * | 1/2000 | Aharoni | H04N 21/2665 709/219 |
| 6,199,169 B1 | * | 3/2001 | Voth | G06F 1/14 713/400 |

(Continued)

OTHER PUBLICATIONS

Dinh Thai Bui et al: "Packet delay variation management for a better IEEE1588V2 performance", 2009 IEEE International Symposium on Precision Clock Synchronization for Measurement, Control and Communication. ISPCS 2009 Oct. 12-16, 2009 Brescia, Italy, 2009 IEEE International Symposium on Precisi, Oct. 12, 2009 (Oct. 12, 2009), pp. 1-6, XP002632262, ISBN: 978-1-4244-4391-8, Retrieved from the Internet: URL: http://ieeexplore.ieee.org/stamp/stamp.jsp?tp=&arnumber=5340212 [retrieved on Apr. 6, 2011].

(Continued)

*Primary Examiner* — Chris Parry
*Assistant Examiner* — Hassan A Khan
(74) *Attorney, Agent, or Firm* — Leydig, Voit & Mayer, Ltd.

(57) ABSTRACT

A method for synchronizing a distributed application includes: transmitting, by an application backend, application data packets to an application frontend; transmitting, by the application backend, a synchronization request packet to the application frontend; retrieving, by the application backend, a backend timestamp from a server clock; retrieving, by the application frontend, a frontend timestamp from a terminal device clock and transmitting the retrieved frontend timestamp to the application backend; calculating, by the application backend, a time offset of the frontend timestamp from the retrieved backend timestamp and using the calculated time offset for synchronization; detecting, by a scheduler, an actual state of a communication connection and transmitting control data to the application backend; and adapting, by the application backend, transmission of synchronization request packets based on the control data (Continued)

indicating jitter of the synchronization request packets preventing the distributed application from being executed synchronously.

15 Claims, 1 Drawing Sheet

(56) References Cited

U.S. PATENT DOCUMENTS

| | | | | |
|---|---|---|---|---|
| 6,292,465 | B1 * | 9/2001 | Vaid | H04L 47/283 |
| | | | | 370/230 |
| 6,990,531 | B2 * | 1/2006 | Vange | H04L 67/101 |
| | | | | 370/231 |
| 8,463,935 | B2 | 6/2013 | Vange et al. | |
| 11,936,569 | B2 * | 3/2024 | Navon | H04L 47/56 |
| 2002/0152271 | A1 * | 10/2002 | Chafle | H04L 12/1827 |
| | | | | 709/204 |
| 2002/0181484 | A1 * | 12/2002 | Aimoto | H04L 47/528 |
| | | | | 370/413 |
| 2003/0048811 | A1 * | 3/2003 | Robie, Jr. | H04J 3/0667 |
| | | | | 370/516 |
| 2008/0112439 | A1 * | 5/2008 | Vestal | H04L 12/4015 |
| | | | | 370/516 |
| 2009/0259762 | A1 * | 10/2009 | Karlsson | H04L 67/1021 |
| | | | | 709/231 |
| 2011/0246665 | A1 * | 10/2011 | Vange | H04L 63/1458 |
| | | | | 709/233 |
| 2020/0259896 | A1 * | 8/2020 | Sachs | H04W 12/06 |
| 2023/0231910 | A1 * | 7/2023 | Barker, Jr. | H04L 12/18 |
| | | | | 709/224 |

OTHER PUBLICATIONS

Caleb Gordon: "White Paper Introduction to IEEE 1588 & Transparent Clocks", Jan. 1, 2009 (Jan. 1, 2009), XP055652547, Retrieved from the Internet: URL: https://web.archive.org/web/20090718191626if_http://www.tekroninternational.com:80/userfiles/file/transparent_clock_white_paper.pdf [retrieved on Dec. 12, 2019].
Ferrari et al: "Delay jitter control scheme for packet-switching internetworks", Computer Communications, Elsevier Science Publishers BV, Amsterdam, NL, vol. 15, No. 6, Jul. 1, 1992 (Jul. 1, 1992), pp. 367-373, XP024226886, ISSN: 0140-3664, DOI: 10.1016/0140-3664(92)90011-3 [retrieved on Jul. 1, 1992] p. 370, left-hand column, paragraph 2—right hand column, paragraph 2, p. 371.
Schulzrinne, et al: "RFC 3550—RTP: A Transport Protocol for Real-Time Applications", Jul. 31, 2003 (Jul. 31, 2003), XP055733063, Retrieved from the Internet: URL: https://tools.ietf.org/html/rfc3550 [retrieved on Sep. 22, 2020] p. 44, paragraph 3—p. 45, paragraph 1.

* cited by examiner

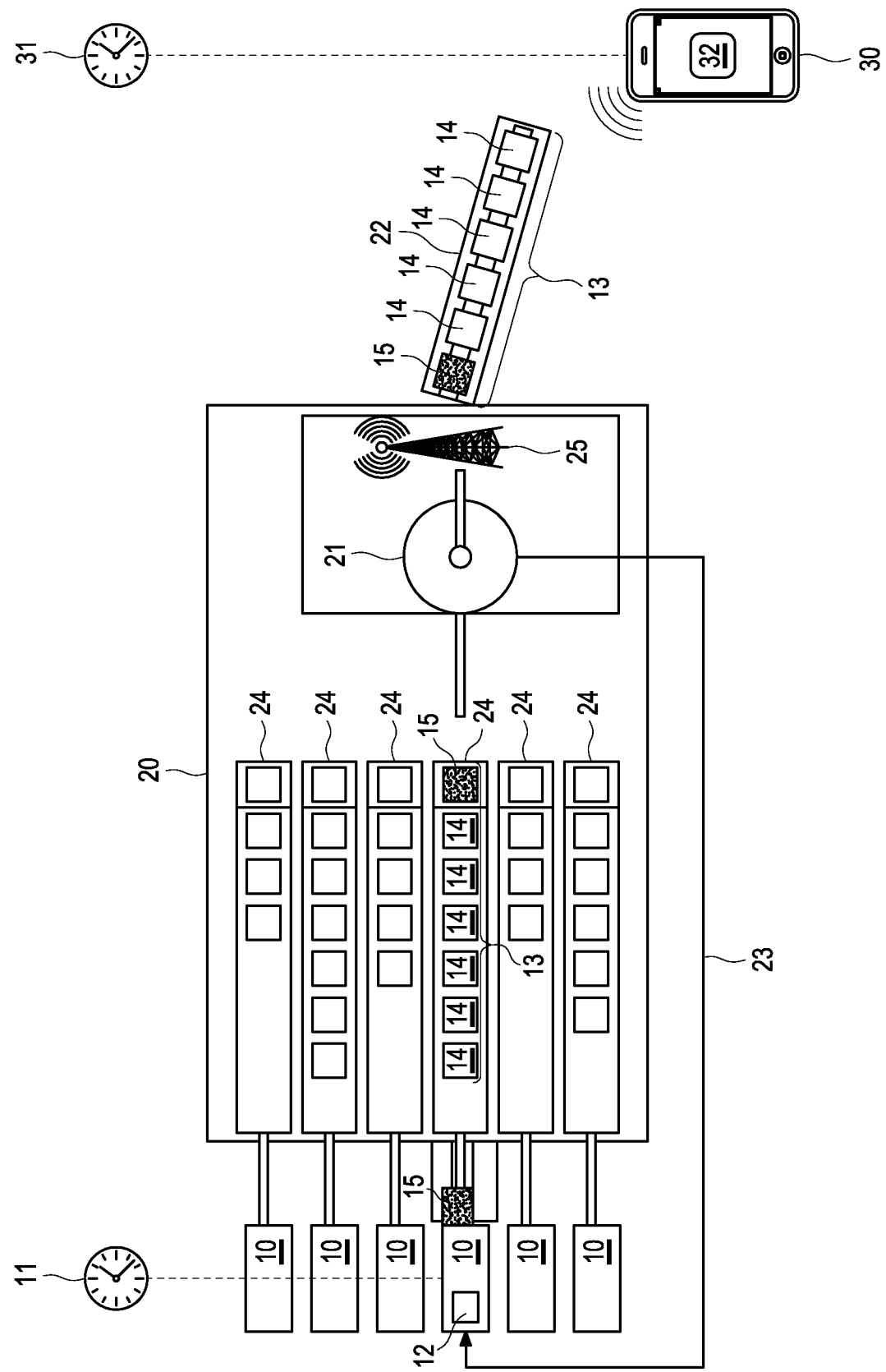

SYNCHRONIZING A DISTRIBUTED APPLICATION VIA A COMMUNICATION NETWORK

CROSS-REFERENCE TO PRIOR APPLICATIONS

This application claims benefit to European Patent Application No. EP 21 167 343.9, filed on Apr. 8, 2021, which is hereby incorporated by reference herein.

FIELD

The invention relates to a method for synchronizing a distributed application. The invention further relates to a distributed application and a computer program product.

BACKGROUND

Methods for synchronizing a distributed application are known in the state of the art and widely used for enabling an application frontend of the distributed application and an application backend of the distributed application to be executed synchronously or in a synchronicity, i.e. with a constant or a substantially constant time offset. The distributed application may comprise, e.g., a business application, a scientific application, a streaming application or a gaming application.

Usually, the application backend is executed by a server while the application frontend is executed by a terminal device being arranged remote from the server. For instance, the terms 'server' and 'terminal device' may refer to hardware entities and the terms 'backend' and 'frontend' may refer to software entities. The server and the terminal device are connected to each other by a communication connection provided by a communication network, while the distributed application is being executed. During the execution of the distributed application the application backend continuously transmits a plurality of application data packets via the communication network to the application frontend.

Each of the server and the terminal device usually comprises a clock, i.e. a local time reference. Of course, a time indicated by the clock of the server may and generally will differ from a time indicated by the clock of the terminal device at a given time. In other words, different timestamps may and generally will be retrieved from the clock of the server and the clock of the terminal device when the respective clocks are read simultaneously.

Exemplarily, U.S. Pat. No. 6,199,169 B1, US 2003/0048811 A1 and the article "Packet Delay variation management for a better IEEE1588V2 performance" by Dinh Thai Bui et al. published related to the International IEEE Symposium on Precision Clock synchronization for Measurement, Control and Communication held Oct. 12 to 16, 2009 in Brescia, Italy, respectively describe methods for synchronizing a clock of a slave node with a clock of a master node via a communication network.

It is noted that synchronizing the distributed application neither implies nor requires setting a clock of the server or a clock of the terminal device synchronous to each other resulting in that timestamps being retrieved simultaneously from the clocks are identical. Rather, the distributed application is considered to be synchronized when the application backend and the application frontend are continuously executed synchronously, i.e. with a constant or substantially constant time offset.

For achieving a synchronous execution of the distributed application, the application backend repeatedly retrieves a backend timestamp by reading the clock of the server and transmits a synchronization request packet via the communication network to the application frontend. The synchronization request packet causes the application frontend, upon receipt of the transmitted synchronization request packet, to retrieve a frontend timestamp by reading the clock of the terminal device and transmit the retrieved frontend timestamp to the application backend. The application backend, upon receipt of the transmitted frontend timestamp, calculates a time offset of the frontend timestamp from the retrieved backend timestamp. The calculated time offset is used by the application frontend for synchronization.

Thus, a data stream from the server to the terminal device comprises both the application data packets and the synchronization request packets transmitted by the application backend, wherein the synchronization request packets are distributed within the data stream, and wherein each synchronization request packet is positioned between two successive application data packets in the data stream.

The communication network is, however, not exclusively used by said distributed application but may and generally will, at the same time, also be used by a plurality of further distributed applications all together eventually generating a heavy load of the communication network. Apart from that, a state of the communication connection used by the distributed application may and generally will vary over time and, hence, possibly be actually insufficient for the distributed application.

When there is a heavy load of the communication network or an insufficient state of the communication connection, the data stream as a whole may temporarily slow down or even halt, i.e. temporarily stagnate. A temporary stagnation of the data stream is the more probable and occurs the more frequently the higher a data rate of the data stream, i.e. a transmission rate of the application backend, and/or the less sufficient the state of the communication connection, i.e. the lower a bitrate and/or the higher a latency of the communication connection, is.

The data rate of the data stream is substantially determined by a number and/or a packet size of the application data packets to be transmitted within a time unit. Modern distributed applications transmit very large data streams and, thus, may easily cause the data stream to temporarily stagnate. An insufficient state of the communication connection is substantially determined by technical conditions of the communication connection. Wireless communication connections, e.g., may suffer from a marginal or shaded position of the terminal device within a radio cell and/or from a handover condition concerning the terminal device and/or from radio signals being damped or interfering due to topographical conditions within a radio cell.

Any temporary stagnation of the data stream also concerns the synchronization request packets preventing them from arriving at the terminal device in time, i.e. forcing them to arrive late at the terminal device. Sporadic late arrivals of synchronization request packets at the terminal device are commonly referred to as a jitter of the synchronization request packets. The jitter inevitably causes the time offset calculated by the application backend to vary. The stronger the jitter is the worse a synchronicity of the distributed application is. Accordingly, reducing the jitter is very desirable for a synchronous execution of the distributed application.

SUMMARY

In an exemplary embodiment, the present invention provides a method for synchronizing a distributed application.

The method includes: transmitting, by an application backend of a distributed application executed by a server, application data packets to an application frontend of the distributed application executed by a terminal device via a communication connection provided by a communication network; transmitting, by the application backend, a synchronization request packet to the application frontend via the communication connection; retrieving, by the application backend, a backend timestamp from a clock of the server; retrieving, by the application frontend, upon receipt of the synchronization request packet, a frontend timestamp from a clock of the terminal device and transmitting the retrieved frontend timestamp to the application backend via the communication connection; calculating, by the application backend, upon receipt of the transmitted frontend timestamp, a time offset of the frontend timestamp from the retrieved backend timestamp and using the calculated time offset for synchronization; detecting, by a scheduler of the communication network, on forwarding the application data packets and synchronization request packets, an actual state of the communication connection and transmitting control data depending on the detected actual state to the application backend; and adapting, by the application backend, upon receipt of the transmitted control data, transmission of the synchronization request packets based on the control data indicating jitter of the synchronization request packets preventing the distributed application from being executed synchronously.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows a block diagram of a system carrying out a method according to the invention for synchronizing a distributed application.

DETAILED DESCRIPTION

Exemplary embodiments of the invention provide a method for synchronizing a distributed application which allows for reducing jitter caused by a communication connection of a communication network. Further exemplary embodiments of the invention provide a distributed application and a computer program product.

A first aspect of the invention is a method for synchronizing a distributed application, comprising the steps: an application backend of a distributed application executed by a server transmits application data packets to an application frontend of the distributed application executed by a terminal device via a communication connection provided by a communication network; the application backend transmits a synchronization request packet to the application frontend via the communication connection; the application backend retrieves a backend timestamp from a clock of the server; the application frontend, upon receipt of the synchronization request packet, retrieves a frontend timestamp from a clock of the terminal device and transmits the retrieved frontend timestamp to the application backend via the communication connection; and the application backend, upon receipt of the transmitted frontend timestamp calculates a time offset of the frontend timestamp from the retrieved backend timestamp and uses the calculated time offset for synchronization.

The application backend is executed by the server and generates a data stream comprising the application data packets and the synchronization request packets to be transmitted via the communication network. The communication network forwards the data stream to the terminal device via a communication connection provided by the communication network. Of course, the generated data stream may be readily forwarded to a plurality of terminal devices in case the distributed application comprises a plurality of application frontends each being executed by a different terminal device.

The application frontend is executed by the terminal device and receives the application data packets and the synchronization request packets. For instance, the terminal device may display the application data packets on a screen and/or with a loudspeaker of the terminal device. Each synchronization request packet may be considered as a time measurement request directed to the application frontend to measure a local time of the terminal device by retrieving a timestamp from the clock of the terminal device.

The server may be a server connected to and being accessible via the communication network. The terminal device may be configured as a smartphone, a tablet, a notebook, a desktop computer, a drone or the like.

According to the invention a scheduler of the communication network, on forwarding the application data packets and the synchronization request packets, detects an actual state of the communication connection and transmits control data depending on the detected actual state to the application backend, and the application backend, upon receipt of the transmitted control data, adapts a transmission of the synchronization request packets when the control data indicate a jitter of the synchronization request packets preventing the distributed application from being executed synchronously.

Preferably, adapting the transmission of the synchronization request packets comprises transmitting the synchronization request packets at varying time intervals. The application backend deviates from a common periodic transmission of the synchronization request packets and optimizes the corresponding transmission events with respect to the respective actual state of the communication connection. The application backend may intentionally delay or even omit a transmission of a synchronization request packet in case the actual state of the communication connection would force the synchronization request packet to arrive late at the terminal device and, hence, to increase the jitter of the synchronization request packets. As a result, the jitter of the synchronization request packets is reduced.

Adapting the transmission of the synchronization request packets particularly comprises transmitting a synchronization request packet when a latency of the communication connection detected by the scheduler is equal to or lower than a predetermined latency for a predetermined minimum time and/or when a bitrate of the communication connection detected by the scheduler is equal to or higher than a predetermined bitrate for a predetermined minimum time.

In other words, synchronization request packets are transmitted when a bitrate of the communication connection continuously exceeds the predetermined minimum bitrate, i.e. when the bitrate does not even short-term decrease substantially. Accordingly, the application backend prefers transmitting a synchronization request packet when there is little risk of stagnation of the data stream. As a result, a risk of synchronization request packets arriving late is reduced resulting in a reduced jitter and a more synchronous execution of the distributed application.

Analogously, synchronization request packets are transmitted when a latency of the communication connection continuously does not exceed the predetermined maximum latency, i.e. when the latency does not even short-term increase substantially. Accordingly, the application backend prefers transmitting a synchronization request packet when there is little risk of stagnation of the data stream. As a result, a risk of synchronization request packets arriving late is reduced resulting in a more synchronous execution of the distributed application.

In further embodiments, adapting the transmission of the synchronization request packets comprises transmitting a synchronization request packet at a maximum possible time distance to a key frame packet when the application data packets form a video stream and/or splitting a large application data packet into at least two small application data packets and transmitting a synchronization request packet at a minimum possible time distance to the first small application data packet.

Transmitting the synchronization request packets at a time distance from the large key frame packets of the video stream reduces a risk of the synchronization request packets arriving late. Splitting the large application data packets results in a more granular data stream without excessively large application data packets, thus, reduces a risk of the synchronization request packets arriving late. Splitting large application data packets and transmitting the synchronization request packets at a time distance from the large key frame packets result in a more synchronous execution of the distributed application, respectively.

In certain exemplary embodiments, adapting the transmission of the synchronization request packets comprises transmitting the synchronization request packets via a communication channel of the communication connection being scheduled at a higher priority than a communication channel of the communication connection the application data packets are transmitted via. In other words, the synchronization request packets are transmitted separately from the application data packets, e.g. use a communication channel, i.e. a queue, separate from a communication channel used by the application data packets. Thus, the synchronization request packets are not affected by a stagnation of the application data packets. As a result, a risk of the synchronization request packets arriving late is reduced resulting in a more synchronous execution of the distributed application.

In certain exemplary embodiments, the application backend, upon receipt of the transmitted control data, adapts a transmission of the application data packets when the control data indicate a jitter of the synchronization request packets preventing the distributed application from being executed synchronously.

Particularly, adapting the transmission of the application data packets comprises adapting a transmission rate and/or a packet size of the application data packets and/or transmitting the application data packets via a communication channel of the communication connection being scheduled at a higher priority than a default communication channel of the communication connection.

Adapting the transmission rate of the application data packets preferably comprises transmitting the application data packets at a transmission rate and/or with a packet size requiring at most a bitrate of the communication connection detected by the scheduler. Accordingly, the application backend strictly avoids overloading the communication connection and causing queues of the communication connection to extend. As a result, the data stream is prevented from stagnation and the synchronization request packets do not arrive late resulting in a more synchronous execution of the distributed application.

It is noted that the term 'transmission rate' refers to the rate the application backend actually applies while the term 'bitrate' refers to the rate the communication connection actually supports. When the transmission rate exceeds the bitrate a queue of the communication connection extends. When, however, the transmission rate is below the bitrate the queue shortens.

In certain exemplary embodiments, adapting the transmission of the application data packets comprises transmitting the application data packets at a transmission rate lower than the bitrate detected by the scheduler. The lower transmission rate tolerates a moderate temporary deterioration of the state of the communication connection without adversely affecting the data stream. As a result, the data stream is even better prevented from stagnation and the synchronization request packets are not delayed by the communication connection resulting in a more synchronous execution of the distributed application.

In other embodiments, the application backend at least acknowledges an inaccuracy of the synchronicity of the distributed application when adapting the transmission of the application data packets does not cause the control data to stop indicating a jitter of the synchronization request packets. Acknowledging, i.e. being aware of, the possible inaccuracy may be beneficial for the application backend even when the application backend is at least temporarily unable to reduce a jitter of the synchronization request packets. Due to the awareness, the application backend may take into account the possible inaccuracy of the synchronicity in a favorable way depending on the type of application.

Detecting the actual state of the communication connection particularly comprises detecting a scheduling delay, a queuing delay, a transmission time and/or a re-transmission rate of the communication connection and/or a handover condition concerning the terminal device. Said delays, times, rates or conditions are readily accessible for being measured or observed by the scheduler in order to detect the actual state of the communication connection.

In certain exemplary embodiments, a radio access network provides the communication connection as the communication network and/or a server of an edge computing data center executes the application backend as the server and/or network time protocol (NTP) packets or precision time protocol (PTP) packets are transmitted as the synchronization request packets.

The radio access network (RAN), i.e. a mobile telecommunication network, e.g. a cellular network or a wireless local area network (WLAN), may be connected to by a plurality of different terminal devices, e.g. a smartphone, a tablet, a notebook, a desktop computer, a drone and the like being arranged or moving within a radio cell of the radio access network.

The edge computing data centers forms part of the radio access network. Round trip times (RTT) are very low for edge computing data centers as compared with internet servers connected to and accessible via the radio access network. Thus, edge computing data centers allow for, e.g., a distributed real time video application, an augmented reality (AR) application or a distributed gaming application wherein a video stream or a game scenery generated by the application backend is transmitted to the terminal device which just displays the video stream or the game scenery and records and transmits corresponding user actions to the server.

The network time protocol (NTP) and the precision time protocol (PTP) are commonly used and well-established protocols for synchronization.

In preferred embodiments, transmitting the control data comprises transmitting a maximum latency and/or a minimum bitrate and/or a predetermined combination of a maximum latency and a minimum bitrate and/or marking an application data packet.

The scheduler sets the maximum latency and/or the minimum bitrate according to the detected latency and/or bitrate, thus, allowing the application backend for adapting the transmission rate of the application data packets to the set maximum latency and/or the minimum bitrate. The scheduler may determine the maximum latency and/or the minimum bitrate from a plurality of predefined combinations of different maximum latencies and/or different minimum bitrates. Each predetermined combination of the maximum latency and/or the minimum bitrate may correspond to a defined quality of service (QoS). The distributed application may require predetermined combinations for being executed properly.

The scheduler, taking into account the detected state of the communication connection, determines and sets the maximum latency and/or the minimum bitrate in order to allow for a quality of service (QoS) required by the distributed application. This configuration is very common configuration in modern communication networks.

The maximum latency and/or the minimum bitrate and/or the predetermined combination of a maximum latency and a minimum bitrate may be directly transmitted to the application backend as the control data. The application backend may set the transmission rate and/or the packet size of the application data packets to, according to the control data, optimally match the maximum latency and/or the minimum bitrate of the communication connection. Alternatively, the control data may be indirectly transmitted to the application backend. The scheduler may mark the application data packets by setting bits in the packet headers, the bits indicating the state of the communication connection. The application frontend, upon receipt of the marked application data packets, reads the set bits of the application data packets and transmits control data to the application backend according to the read bits.

Adapting, thus, may comprise increasing or decreasing the transmission rate and/or the packet size of the application data packets when the latency decreases or increases, respectively, or when the bitrate increases or decreases, respectively. As a result, a risk of a stagnation of the data stream and the synchronization request packets arriving late is reduced resulting in a more synchronous execution of the distributed application.

A second aspect of the invention is a distributed application, comprising an application backend to be executed by a server and an application frontend to be executed by a terminal device in synchronicity with the application backend. The distributed application may, for instance, comprise a business application, a scientific application, a streaming application or a gaming application.

According to the invention the distributed application is configured for participating in a method according to the invention for synchronizing the application frontend with the application backend. The distributed application is configured for adequately reacting to control data received from a scheduler of communication network as described above. The distributed application benefits from a very precise synchronicity which is not affected by a heavy load of the communication network.

A third aspect of the invention is a computer program product, comprising a storage medium with a program code implementing a distributed application. The storage medium may be a CD, a DVD, a USB stick, a memory chip, a hard disk and the like. The program code comprised by the computer program product may be executable by the server and the terminal device, respectively, immediately or after having been installed thereon.

According to the invention the program code causes an application backend of the distributed application and an application frontend of the distributed application to participate in a method according to invention when being executed by a processor of a server and a terminal device, respectively. The computer program product creates a distributed application being configured for adequately reacting to control data received from a scheduler of a communication network as described above. The distributed application benefits from a very precise synchronicity which is not affected by a heavy load of the communication network.

It is advantageous that a distributed application comprising an application backend and an application frontend connected to each other via a communication connection of a communication network is executed very synchronously even with a heavy load of the communication network or an insufficient actual state of the communication connection. Due to a method according to the invention, a precision of the synchronization is not or not substantially affected by a bottleneck condition occurring in the communication network.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

FIG. 1 schematically shows a block diagram of a system carrying out a method according to the invention for synchronizing a distributed application 12, 32. The system comprises a communication network 20, which is exemplarily configured as a radio access network (RAN), such as a wireless telecommunication network, e.g. a cellular network, with an antenna 25 creating a radio cell of the communication network 20.

Furthermore, the system comprises a plurality of servers 10 each having a clock 11. The servers 10 are preferably arranged close to the antenna 25, i.e. the servers 10 form an edge computing data center. Of course, the invention is as well applicable to different communication networks, e.g., wired communication networks. The system also comprises a terminal device 30 with a clock 31. The terminal device 30 is exemplarily configured as a user equipment (UE), such as a smartphone, a tablet, a notebook, a desktop computer, a drone or the like, being arranged and/or moving within the radio cell.

The communication network 20 defines a plurality of communication channels 24 which are configured as queues. Furthermore, the communication network 20 comprises a scheduler 21 for selecting packets 14, 15 from the communication channels 24 and forwarding each selected packet 14, 15 to the antenna 25.

The system comprises a distributed application 12, 32 with an application backend 12 to be executed by the server 10 and an application frontend 32 to be executed by the terminal device 30. The application backend 12 is configured for generating and transmitting a data stream comprising a plurality of application data packets 14 and synchronization request packets 15 to the application frontend 32. The application frontend 32 is configured for receiving the data stream 13 from the application backend 12. The distributed application 12, 32 is further configured for participating in a method described below for synchronizing the application frontend 32 with the application backend 12.

For instance, the distributed application 12, 32 is an edge cloud gaming application and the application data packets 14 form a video stream comprising the continuously changing game scenery to be displayed by the terminal device 30, particularly on a screen and/or with a loudspeaker of terminal device 30.

A computer program product may be used for setting up the distributed application 12, 32. The computer program product comprises a storage medium with a program code implementing the application backend 12. The program code causes the application backend 12 and the application frontend 32 to participate in the following method when being executed by a processor of a server 10 and a terminal device 30, respectively.

The system carries out the following method for synchronizing the distributed application 12, 32.

The application backend 12 which is executed by the server 10 of the edge computing data center transmits application data packets 14 to the application frontend 32 which is executed by the terminal device 30 via a communication connection 22 provided by the communication network 20. Exemplarily, a radio access network, i.e. a wireless communication network, e.g. a cellular network, provides the communication connection 22 as the communication network 20.

The application backend 12 retrieves a backend timestamp from the clock 11 of the server 10 and transmits synchronization request packets 15 to the application frontend 32 via the communication connection 22. NTP packets or a PTP packets may be transmitted as the synchronization request packets 15.

Upon receipt of the synchronization request packet 15, the application frontend 32 retrieves a frontend timestamp from the clock 31 of the terminal device 30 and transmits the retrieved frontend timestamp to the application backend 12 via the communication connection 22. The application backend 12, upon receipt of the transmitted frontend timestamp, calculates a time offset of the frontend timestamp from the retrieved backend timestamp and uses the calculated time offset for synchronization.

The scheduler 21 of the communication network 20, on forwarding the application data packets 14 and the synchronization request packets 15, detects an actual state of the communication connection 22. Detecting the actual state of the communication connection 22 may comprise detecting a scheduling delay, a queuing delay, a transmission time, a re-transmission rate of the communication connection 22 and/or a handover condition concerning the terminal device 30.

The scheduler 21 transmits control data 23 indicating the actual state of the communication connection 22. Transmitting the control data 23 comprises transmitting a maximum latency and/or a minimum bitrate and/or a predetermined combination of a maximum latency and a minimum bitrate and/or marking an application data packet 14.

The application backend 32, upon receipt of the transmitted control data 23, adapts a transmission of the synchronization request packets 15 when the control data 23 indicate a jitter of the synchronization request packets 15 preventing the distributed application 12, 32 from being executed synchronously. Adapting the transmission of the synchronization request packets 15 may comprise transmitting the synchronization request packets 15 at varying time intervals.

Adapting the transmission of the synchronization request packets 15 may comprise transmitting a synchronization request packet 15 when a latency of the communication connection 22 detected by the scheduler 21 is equal to or lower than a predetermined latency for a predetermined minimum time and/or when a bitrate of the communication connection 22 detected by the scheduler 21 is equal to or higher than a predetermined bitrate for a predetermined minimum time.

Adapting the transmission of the synchronization request packets 15 particularly comprises transmitting a synchronization request packet 15 at a maximum possible time distance to a key frame packet when the application data packets 14 form a video stream and/or splitting a large application data packet 14 into at least two small application data packets and transmitting a synchronization request packet 15 at a minimum possible time distance to the first small application data packet.

Adapting the transmission of the synchronization request packets 15 may additionally or alternatively comprise transmitting the synchronization request packets 15 via a communication channel 24 of the communication connection 22 being scheduled at a higher priority than a communication channel 24 of the communication connection 22 the application data packets 14 are transmitted via.

Preferably, the application backend 12, upon receipt of the transmitted control data 23, adapts a transmission of the application data packets 14 when the control data 23 indicate a jitter of the synchronization request packets 15 preventing the distributed application 12, 32 from being executed synchronously.

Adapting the transmission of the application data packets 14 may comprise adapting a transmission rate and/or a packet size of the application data packets 14 and/or transmitting the application data packets 14 via a communication channel 24 of the communication connection 22 being scheduled at a higher priority than a default communication channel 24 of the communication connection 22.

Particularly, adapting the transmission rate of the application data packets 14 comprises transmitting the application data packets 14 at a transmission rate and/or with a packet size requiring at most a bitrate of the communication connection 22 detected by the scheduler 21.

Adapting the transmission of the application data packets 14 may comprise transmitting the application data packets 14 at a transmission rate lower than the bitrate detected by the scheduler 21.

Finally, the application backend 12 may at least acknowledge an inaccuracy of the synchronicity of the distributed application 12, 32 when adapting the transmission of the application data packets 14 does not cause, particularly when at least one or even all of the transmission adaptations specified above do not cause, the control data 23 to stop indicating a jitter of the synchronization request packets 15.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 10 server
11 clock
12 application backend
13 data stream
14 application data packet
15 synchronization request packet
20 communication network
21 scheduler
22 communication connection
23 control data
24 communication channel
25 antenna
30 terminal device
31 clock
32 application frontend

The invention claimed is:

1. A method for synchronizing a distributed application, comprising:
   transmitting, by an application backend of a distributed application executed by a server, application data packets to an application frontend of the distributed application executed by a terminal device via a communication connection provided by a communication network;
   transmitting, by the application backend, a synchronization request packet to the application frontend via the communication connection;
   retrieving, by the application backend, a backend timestamp from a clock of the server;
   retrieving, by the application frontend, upon receipt of the synchronization request packet, a frontend timestamp from a clock of the terminal device and transmitting the retrieved frontend timestamp to the application backend via the communication connection;
   calculating, by the application backend, upon receipt of the transmitted frontend timestamp, a time offset of the frontend timestamp from the retrieved backend timestamp and using the calculated time offset for synchronization;
   detecting, by a scheduler of the communication network, on forwarding the application data packets and synchronization request packets, an actual state of the communication connection and transmitting control data depending on the detected actual state to the application backend; and
   adapting, by the application backend, upon receipt of the transmitted control data, transmission of the synchronization request packets based on the control data indicating jitter of the synchronization request packets preventing the distributed application from being executed synchronously.

2. The method according to claim 1, wherein adapting the transmission of the synchronization request packets comprises transmitting the synchronization request packets at varying time intervals.

3. The method according to claim 1, wherein adapting the transmission of the synchronization request packets comprises: transmitting a synchronization request packet based on a latency of the communication connection detected by the scheduler being equal to or lower than a predetermined latency for a predetermined minimum time and/or based on a bitrate of the communication connection detected by the scheduler being equal to or higher than a predetermined bitrate for a predetermined minimum time.

4. The method according to claim 1, wherein adapting the transmission of the synchronization request packets comprises:
   transmitting a synchronization request packet at a maximum possible time distance to a key frame packet based on the application data packets forming a video stream; and/or
   splitting a large application data packet into at least two small application data packets and transmitting a synchronization request packet at a minimum possible time distance to a first small application data packet.

5. The method according to claim 1, wherein adapting the transmission of the synchronization request packets comprises transmitting the synchronization request packets via a communication channel of the communication connection scheduled at a higher priority than a communication channel of the communication connection used for transmission of the application data packets.

6. The method according to claim 1, wherein the application backend, upon receipt of the transmitted control data, adapts a transmission of the application data packets based on the control data indicating jitter of the synchronization request packets preventing the distributed application from being executed synchronously.

7. The method according to claim 1, wherein adapting the transmission of the application data packets comprises:
   adapting a transmission rate and/or a packet size of the application data packets; and/or
   transmitting the application data packets via a communication channel of the communication connection scheduled at a higher priority than a default communication channel of the communication connection.

8. The method according to claim 7, wherein adapting the transmission rate of the application data packets comprises transmitting the application data packets at a transmission rate and/or with a packet size requiring at most a bitrate of the communication connection detected by the scheduler.

9. The method according to claim 7, wherein adapting the transmission of the application data packets comprises transmitting the application data packets at a transmission rate lower than the bitrate detected by the scheduler.

10. The method according to claim 7, wherein the application backend at least acknowledges an inaccuracy of the synchronicity of the distributed application based on adapting the transmission of the application data packets not causing the control data to stop indicating jitter of the synchronization request packets.

11. The method according to claim 1, wherein detecting the actual state of the communication connection comprises detecting a scheduling delay, a queuing delay, a transmission time and/or a re-transmission rate of the communication connection and/or a handover condition concerning the terminal device.

12. The method according to claim 1, wherein a radio access network provides the communication connection as the communication network and/or a server of an edge computing data center executes the application backend as the server and/or network time protocol (NTP) packets or precision time protocol (PTP) packets are transmitted as the synchronization request packets.

13. The method according to claim 1, wherein transmitting the control data comprises transmitting a maximum latency and/or a minimum bitrate and/or a predetermined combination of a maximum latency and a minimum bitrate and/or marking an application data packet.

14. A system for executing a distributed application, the system comprising:
  a server configured to execute an application backend; and
  a terminal device configured to execute an application frontend in synchronicity with the application backend;
  wherein the application backend is configured to:
    transmit application data packets to the application frontend via a communication connection provided by a communication network;
    transmit a synchronization request packet to the application frontend via the communication connection; and
    retrieve a backend timestamp from a clock of the server;
  wherein the application frontend is configured to retrieve, upon receipt of the synchronization request packet, a frontend timestamp from a clock of the terminal device and transmit the retrieved frontend timestamp to the application backend via the communication connection;
  wherein the application backend is configured to:
    calculate, upon receipt of the transmitted frontend timestamp, a time offset of the frontend timestamp from the retrieved backend timestamp and using the calculated time offset for synchronization; and
    adapt, upon receipt of control data from a scheduler of the communication network, transmission of synchronization request packets based on the control data indicating jitter of the synchronization request packets preventing the distributed application from being executed synchronously.

15. One or more non-transitory computer-readable mediums having processor-executable instructions stored thereon for synchronizing a distributed application, wherein the processor-executable instructions, when executed, facilitate:
  transmitting, by an application backend of a distributed application executed by a server, application data packets to an application frontend of the distributed application executed by a terminal device via a communication connection provided by a communication network;
  transmitting, by the application backend, a synchronization request packet to the application frontend via the communication connection;
  retrieving, by the application backend, a backend timestamp from a clock of the server;
  retrieving, by the application frontend, upon receipt of the synchronization request packet, a frontend timestamp from a clock of the terminal device and transmitting the retrieved frontend timestamp to the application backend via the communication connection;
  calculating, by the application backend, upon receipt of the transmitted frontend timestamp, a time offset of the frontend timestamp from the retrieved backend timestamp and using the calculated time offset for synchronization;
  detecting, by a scheduler of the communication network, on forwarding the application data packets and synchronization request packets, an actual state of the communication connection and transmitting control data depending on the detected actual state to the application backend; and
  adapting, by the application backend, upon receipt of the transmitted control data, transmission of the synchronization request packets based on the control data indicating jitter of the synchronization request packets preventing the distributed application from being executed synchronously.

* * * * *